US012786062B2

(12) United States Patent
Verma et al.

(10) Patent No.: US 12,786,062 B2
(45) Date of Patent: Nov. 3, 2026

(54) POLICY ORCHESTRATION FRAMEWORK TO SUPPORT END-TO-END (E2E) MULTI ACCESS NETWORK POLICY ARCHITECTURE WITH TOP-TO-BOTTOM POLICY ORCHESTRATION

(71) Applicant: RAKUTEN MOBILE, INC., Tokyo (JP)

(72) Inventors: Saurabh Verma, Tokyo (JP); Masahiko Nanri, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 723 days.

(21) Appl. No.: 18/327,003

(22) Filed: May 31, 2023

(65) Prior Publication Data

US 2024/0406067 A1 Dec. 5, 2024

(51) Int. Cl.
*H04L 41/0894* (2022.01)
*H04W 28/16* (2009.01)

(52) U.S. Cl.
CPC ......... *H04L 41/0894* (2022.05); *H04W 28/16* (2013.01)

(58) Field of Classification Search
CPC ............. H04L 41/0894; H04L 12/1407; H04L 41/0895; H04W 28/16; H04M 15/66
See application file for complete search history.

(56) References Cited

U.S. PATENT DOCUMENTS

| | | | | |
|---|---|---|---|---|
| 10,601,776 | B1 * | 3/2020 | Burakovsky | H04W 12/088 |
| 2021/0175950 | A1 * | 6/2021 | Sergeev | H04B 7/0634 |
| 2022/0141708 | A1 * | 5/2022 | Arrobo Vidal | H04L 69/22 370/329 |
| 2023/0300728 | A1 * | 9/2023 | Kundu | G06F 9/541 |
| 2024/0114392 | A1 * | 4/2024 | Huda | H04L 45/08 |
| 2024/0314229 | A1 * | 9/2024 | Condoluci | H04L 69/321 |
| 2025/0184084 | A1 * | 6/2025 | Mondal | H04L 5/0053 |
| 2026/0052432 | A1 * | 2/2026 | Han | H04L 67/141 |

* cited by examiner

*Primary Examiner* — Michael A Keller
*Assistant Examiner* — Thao D Duong
(74) *Attorney, Agent, or Firm* — HAUPTMAN HAM, LLP

(57) ABSTRACT

A Policy Orchestration Framework to support end-to-end (E2E) multi access network policy architecture with top-to-bottom policy orchestration. A frontend network is provided having a first plurality of layers supporting network services. A backend network is provided having a second plurality of layers supporting network services. A policy orchestration provides an end-to-end view between the frontend network and the backend network. The policy orchestrator coordinates end-to-end policy decisions for the first plurality of layers of the frontend and for the second plurality of layers of the backend. Intercommunications between the first plurality of layers and between the second plurality of layers uses Push Messages and Pull messages between the first plurality of layers and between the second plurality of layers.

20 Claims, 11 Drawing Sheets

Fig. 4
400
Policy Reference Architecture – Hierarchical Architecture Level
410
Use Cases or Applications
420
Network Services End-to-End
430
Network Node or Network Function
440
System/Platform
• Use Case Level, Network Slicing, Application Level, etc.
412
414
416
• Network Service Level, End-to-End Bearer Level, etc.
422
424
• Node Level, Service Differentiation, etc.
432
434
• Platform Level, Infrastructure, Resources, etc.
442
444
446

Fig. 9
900
910
Push: For Policy Enforcement
922 Src Level •••
924 Destination Level •••
932 Src Realm •••
934 Destination Realm •••
942 Src Lewvel Policy Node
944 Destination Policy Node
950 Enforcement Node •••
952 Service Level Requirement •••
954 Resource Status •••
920 Hierarchal Level
930 Routing Component
Policy Management Node Identifier 940
960
Pull: For Resource Assessments
926 Src Level •••
928 Destination Level •••
936 Src Realm •••
938 Destination Realm •••
946 Src Level Enforcement Node
948 Destination Enforcement Node
970 Policy Node •••
972 Service Level Requirement •••
974 Resource Status •••

POLICY ORCHESTRATION FRAMEWORK TO SUPPORT END-TO-END (E2E) MULTI ACCESS NETWORK POLICY ARCHITECTURE WITH TOP-TO-BOTTOM POLICY ORCHESTRATION

TECHNICAL FIELD

This description relates to a Policy Orchestration Framework to support end-to-end (E2E) multi access network policy architecture with top-to-bottom policy orchestration, and method of using the same.

BACKGROUND

Mobile networks are transitioning from connectivity centric networks to application centric networks. There are certain terminologies in the market, such as metaverse, that involve new or next generation applications. These new applications are going to impact the network by making the network more complex in terms of the connectivity and rely on new application requirements.

In a mobile network, policies of the network operator are defined, such as control policies. Current methods of policy implementation address the policy management for specific scenarios, but are limited to such specific network architectures.

Current policy management potentially does not provide end-to-end visibility of network capabilities or apply policies for specific services using a top-to-bottom network specific capability visibility.

SUMMARY

In at least embodiment, a method for providing a policy orchestration framework to support an end-to-end (E2E) policy architecture with top to bottom policy orchestration includes providing a frontend network having a first plurality of layers supporting network services, providing a backend network having a second plurality of layers supporting the network services, and providing policy orchestration by providing an end-to-end view between the frontend network and the backend network, and coordinating end-to-end policy decisions for the first plurality of layers of the frontend network and for the second plurality of layers of the backend network.

In at least one embodiment, a policy orchestrator includes a memory storing computer-readable instructions, and a processor connected to the memory, wherein the processor is configured to execute the computer-readable instructions to provide an end-to-end view between a frontend of a network having a first plurality of layers and a backend of the network having a second plurality of layers, and coordinate end-to-end policy decisions for the first plurality of layers of the frontend of the network and for the second plurality of layers of the backend of the network based on the end-to-end view.

In at least one embodiment, a non-transitory computer-readable media having computer-readable instructions stored thereon, which when executed by a processor causes the processor to perform operations including providing a frontend network having a first plurality of layers supporting network services, providing a backend network having a second plurality of layers supporting the network services, and providing policy orchestration by providing an end-to-end view between the frontend network and the backend network, and coordinating end-to-end policy decisions for the first plurality of layers of the frontend network and for the second plurality of layers of the backend network based the end to end view.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
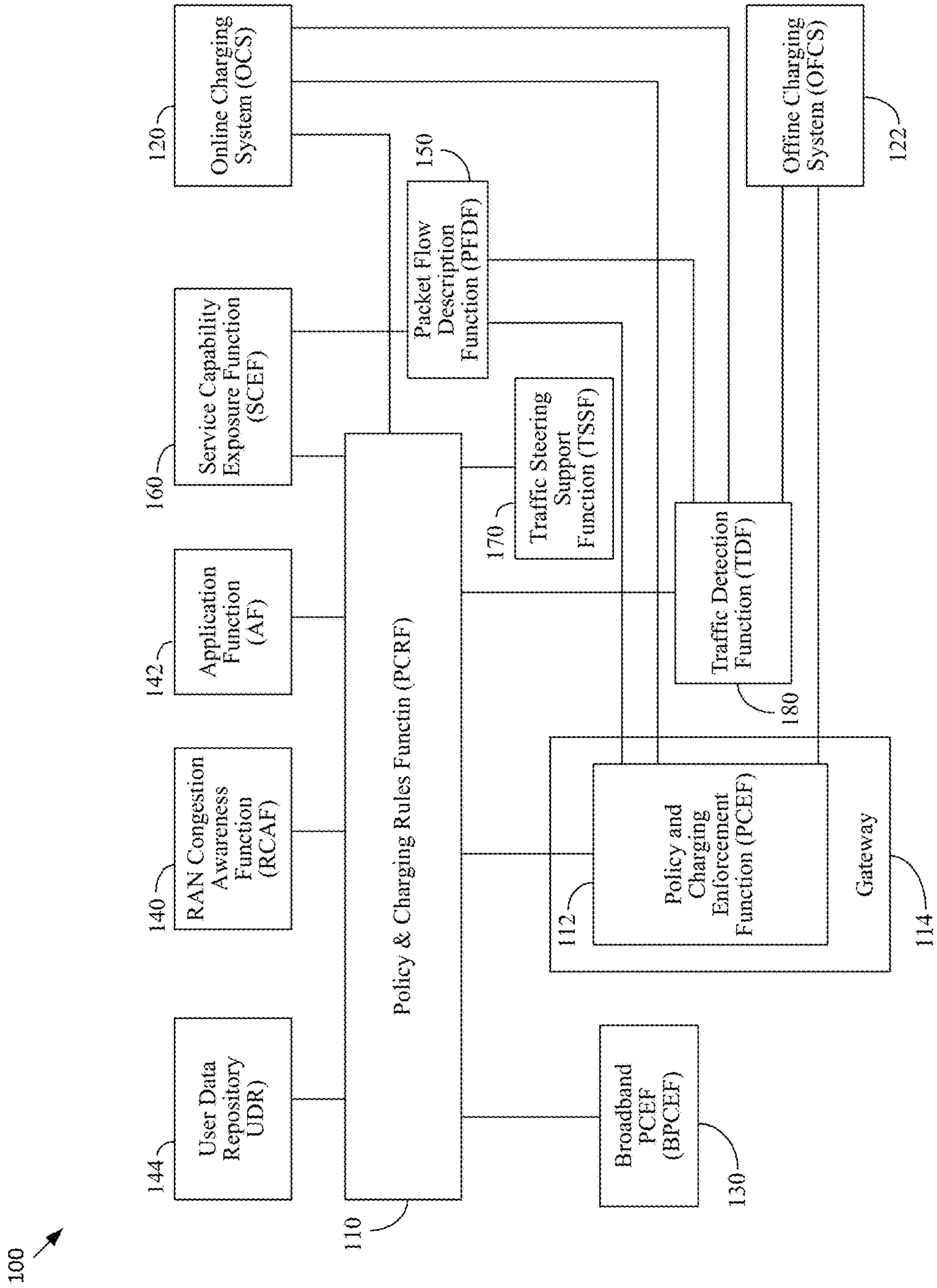
FIG. 1 illustrates the 3GPP Architecture for Policy and Charging Control (PCC).

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In at least one embodiment, a method for providing a policy orchestration framework to support an end-to-end (E2E) policy architecture with top to bottom policy orchestration includes providing a frontend network having a first plurality of layers supporting network services, providing a backend network having a second plurality of layers supporting the network services, and providing policy orchestration by providing an end-to-end view between the frontend network and the backend network, and coordinating end-to-end policy decisions for the first plurality of layers of the frontend network and for the second plurality of layers of the backend network. Intercommunications between the first plurality of layers and between the second plurality of layers uses Push Messages and Pull messages between the first plurality of layers and between the second plurality of layers. Policy Orchestrator provides metadata for Push and Pull Messages, including metadata for Hierarchal Level information, Routing Component information, and Policy Management Node Identifiers. Metadata for Policy Enforcement includes Hierarchal Level information that specifies a Source (Src) Level and Destination Level, Routing Component information that includes the Source (Src) Realm and the Destination Realm, and Policy Management Node Identifier information that includes Source (Src) Level Policy Node, and Destination Policy Node. Other metadata includes Enforcement Node, Service Level Requirement, Resource Status, etc. Metadata for Resource Assessments includes Hierarchal Level information specifies a Source (Src) Level and Destination Level, Routing Component information that includes the Source (Src) Realm and the Destination Realm, and Policy Management Node Identifier information that includes Source (Src) Level Enforcement Node, and Destination Enforcement Node. Other metadata includes Policy Node, Service Level Requirement, Resource Status, etc.

Embodiments described herein provide method that provides one or more advantages. For example, a Policy Orchestrator according to at least one embodiment provides a top-to-bottom policy architecture for multi access networks. Policy Orchestrator according to at least one embodiment provide a framework for coordination of various policy specific network entities. The Policy Orchestrator provides end-to-end visibility of network capabilities and applies policies for specific services. The Policy Orchestrator according to at least one embodiment enables a network to apply and manage policies on various grades and levels of services for better service delivery and network performance.

FIG. 1 illustrates the 3GPP Architecture for Policy and Charging Control (PCC) 100.

In FIG. 1, different network functions are shown, including the Policy and Charging Rules Function (PCRF) 110 and the Policy and Charging Enforcement Function (PCEF) 112. PCRF 110 provides a centralized policy decision point that deploys business policy and charging rules to allocate broadband network resources and manages flow-based charges for subscribers and services. PCRF 110 pushes the rules down to the Policy and Charging Enforcement Function (PCEF) 112. PCEF 112 provides user traffic handling and QoS at the Gateway 114, provides service data flow detection, and applies the rules received from the PCRF 110. PCEF 112 optionally interacts with the Online Charging Function (OCF) 120 and Offline Charging System (OFCS) 122 to retrieve policy and charging authorization for quotas and credit control.

OCS 120 is responsible for interacting with the PCEF 112 to perform real-time charging for services. OCS 120 authorizes subscribers' sessions subject to available credit on account and decrements account balance as services are consumed. When a subscriber's account balance is depleted authorization may be withdrawn and ongoing session(s) terminated. OFCS 122 collects charging information for network resource usage concurrently with that resource usage. Broadband PCEF (BPCEF) 130 interacts with the PCRF 110 and enables the signaling of QoS control decisions.

RAN Congestion Awareness Function (RCAF) 140 is an element that provides RAN User Plane Congestion Information (RUCI) to the PCRF 110 to enable the PCRF 110 to take the RAN user plane congestion status into account for policy decisions.

Packet Flow Description Function (PFDF) 150 is a repository which stores Packet Flow Descriptions (PFDs) that can be managed, i.e. added, updated, or removed, by the SCS/AS (can be 3rd party AS) via the Service Capability Exposure Function (SCEF) 160. Traffic Steering Support Function (TSSF) 170 is a function that receives traffic steering control information from the PCRF 110 and ensures that the related traffic steering policy is enforced. A traffic steering policy is locally configured in TSSF 170 and can be used for uplink, downlink or for uplink and downlink directions. To ensure that the traffic steering policy is enforced, the TSSF 170 performs deployment specific actions as configured for that traffic steering policy.

SCEF 160 securely exposes the services and capabilities provided by 3GPP network interfaces. Application Function (AF) 142 is a functional element that provides session related information to the PCRF 110. Traffic Detection Function (TDF) 180 enforces traffic policies in real-time based on either pre-set rules or rules determined dynamically by the policy control rules function (PCRF) 110. User Data Repository (UDR) 144 stores converged user related subscription data that is accessed by the PCRF.

3GPP Architecture for Policy and Charging Control (PCC) 100 applies network policies using a horizontal approach. Policy decisions are made at back end of network and flowed to front end for enforcement, where-in respective node apply the policy depending on best efforts and availability of its resources.

Figure 2:
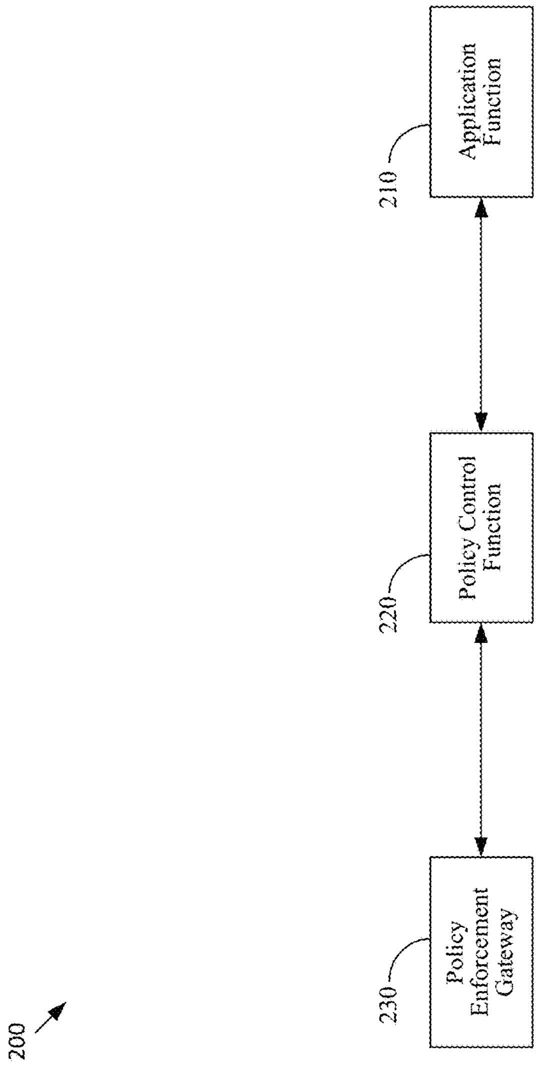
FIG. 2 shows the horizontal approach to policy decisions according to the 3GPP Architecture.

FIG. 2 shows the horizontal approach to policy decisions 200 according to the 3GPP Architecture.

In FIG. 2, a gateway forwards policies to the frontend of the network using a horizontal approach where Application Functions 210 provides requirements to the Policy Control Functions 220. Policy Control Functions 220 decide the kind of policy to apply on the network. Policy parameters are sent to the Policy Enforcement Gateway 230. Policy Enforcement Gateway 230 follows certain procedures to provide decision policy decision parameters to the frontend of the network irrespective of the knowledge of having resources to apply those policies.

Policy decisions are taken in centralized way, and policy decisions are applied within the network at the very backend of the network and that decision, once taken, flows from the backend to the frontend in terms of certain scalar indicators. The policy is applied at the different levels of the network based on that scalar indicator so that the different levels of the network from the backend to the frontend apply the policy based on whatever the resources level are used at that point of time.

This horizontal approach does not provide a complete end-to-end visibility of network resources. For example, a decision is made at the backend and those quality decisions are provided to the different levels of the network from the backend to the frontend in some scalar indicator and based on that scalar indicator, and at a node of the network at a different level a decision is made about how to apply a policy decision based on existing resources. Thus, there is not a complete end-to-end visibility of the networks to make a policy decision for levels of the network.

Figure 3:
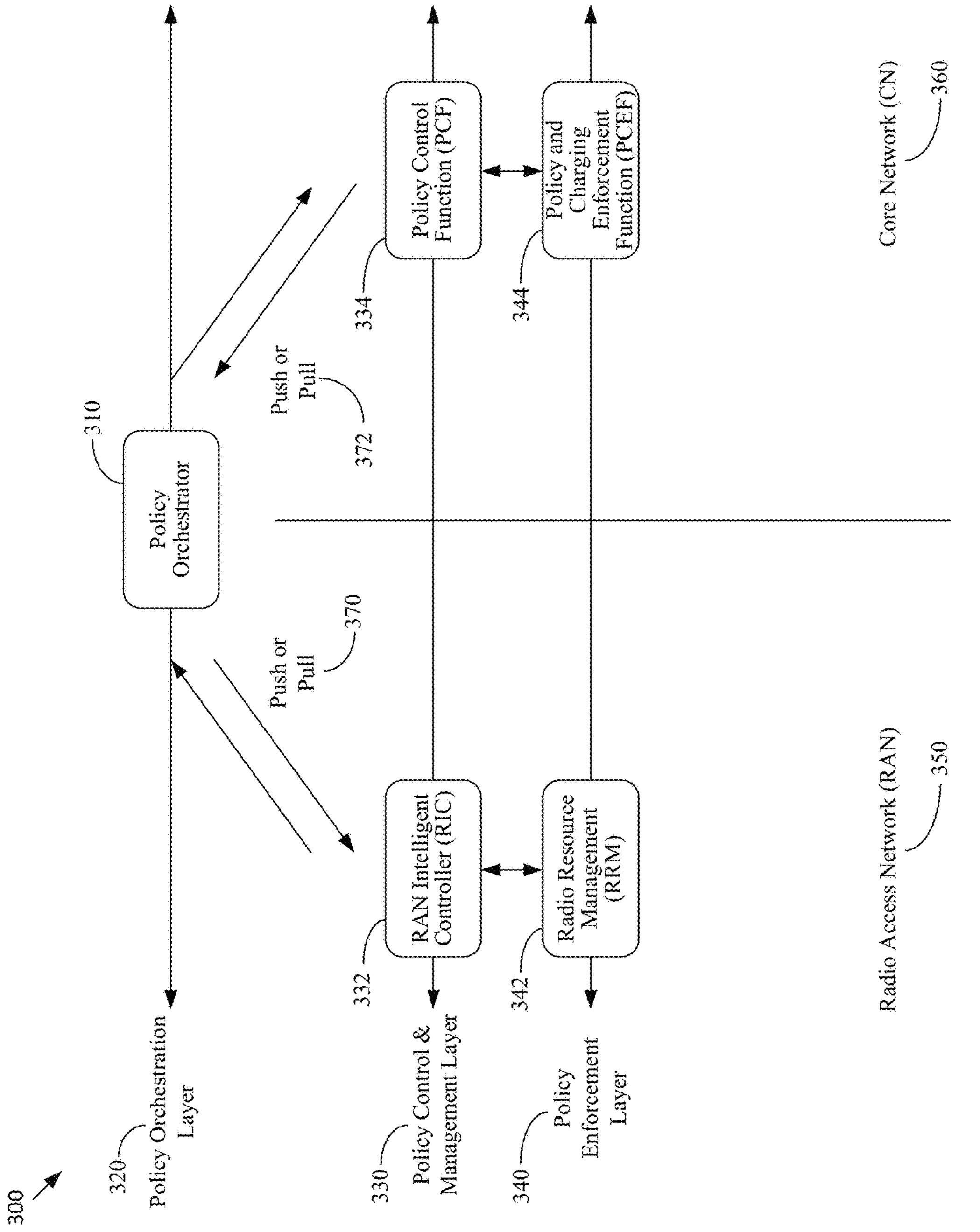
FIG. 3 illustrates a top-to-bottom approach to policy orchestration according to at least one embodiment.

FIG. 3 illustrates a top-to-bottom approach to policy orchestration 300 according to at least one embodiment.

In FIG. 3, Policy Orchestrator 310 uses a hierarchical policy management architecture to deliver a plurality of levels of resources and services. The Policy Orchestrator 310 provides a framework to coordinate policy decisions at different functional levels. The Policy Orchestrator 310 provides a comprehensive and adaptive policy framework that provides top-to-bottom and bottom-to-top visibility of a network to set and provide application centric networks and respective services using a complete end-to-end view.

Three different layers are illustrated in the top-to-bottom approach to policy orchestration 300 according to at least one embodiment: The three layers include the Policy Orchestration Layer 320, the Policy Control and Management Layer 330, and the Policy Enforcement Layer 340. Policy Orchestrator 310 coordinates policies top-to-bottom and end-to-end between a frontend and a backend. A frontend network is referred to as a Radio Access Network (RAN) 350. The backend network is referred to as a Core Network 360. The RAN 350 provides a Policy Control and Management Layer 330 via a RAN Intelligent Controller (RIC) 332, and a Policy Enforcement Layer 340 via the Radio Resource Management (RRM) 342. The Core Network 360 provides a Policy Control and Management Layer 330 via a Policy Control Function (PCF) 334, and a Policy Enforcement Layer 340 via the Policy and Charging Enforcement Function (PCEF) 344.

The RIC 332 performs Resource Management and Coordination for the RAN 350. The RIC 332 manages the network node resources and controls the network node resources intelligently. The PCF 334 on the Core Network 360 performs Resource Management and Coordination, manages network node resources, and controls the network node resources.

At the Policy Enforcement Layer 340 on the RAN 350, the RRM 334 enforces policy decisions specified by at the Policy Control and Management Layer 330. The PCEF 344 on the Core Network 360 enforces policy decisions specified by at the Policy Control and Management Layer 330 of the Core Network 360.

The Policy Orchestrator 310 provides more visibility of resource capability at the RAN 350. Because the frontend provided by the RAN 350 and the backend provided by the Core Network 360 are two independent entities, the policy applied to the Core Network 360 is independent of the policy applied at the RAN 350. The Policy Orchestrator 310 according to at least one embodiment provides coordination between the Policy Control and Management Layer 330 and the Policy Enforcement Layer 340 of the RAN 350 and the Policy Control and Management Layer 330 and the Policy Enforcement Layer 340 of the Core Network 360 so that the decision of the policy that is taken is based on the end-to-end visibility of the resources within the network. Policy Orchestrator 310 coordinates policies top-to-bottom and end-to-end in the RAN 350 and the Core Network 360 using Push/Pull Messages 370 and Push/Pull Messages 372, respectively.

Figure 4:
FIG. 4 is a policy reference architecture providing a hierarchical view of the architectural levels according to at least one embodiment.

FIG. 4 is a policy reference architecture 400 providing a hierarchical view of the architectural levels according to at least one embodiment.

As depicted in FIG. 4 the vertical cross section view of the system is layered in four different levels for policy orchestration point of view. The Policy Orchestrator provides visibility of the network through the Use Cases of Applications level 410, the Network Service End-to-End level 420, the Network Node or Network Function level 430, and the System/Platform level 440.

Visibility of the applications that are running over the network are provided. At the Use Cases or Application level 410, the Policy Orchestrator according to at least one embodiment provides visibility of use case level 412, network slicing 414, applications 416, etc. For example, certain access networks involve fiber at the home and connecting to home Wi-Fi.

At the Network Service End-to-End level 420, the Policy Orchestrator according to at least one embodiment provides visibility of network services 422, end-to-end bearers 424, etc. At the Network Node or Network Function level 430, the Policy Orchestrator according to at least one embodiment provides visibility of nodes 432, service differentiation 434, etc. For example, visibility of different network nodes, such as particular gateways or routers that are involved.

At the System/Platform level 440, the Policy Orchestrator according to at least one embodiment provides visibility of the platform 442, the infrastructure 444, resources 446, etc. For example, visibility of the computing platform is a particular router. The Policy Orchestrator applies a policy at the levels of the functions that are running to support an application.

Figure 5:
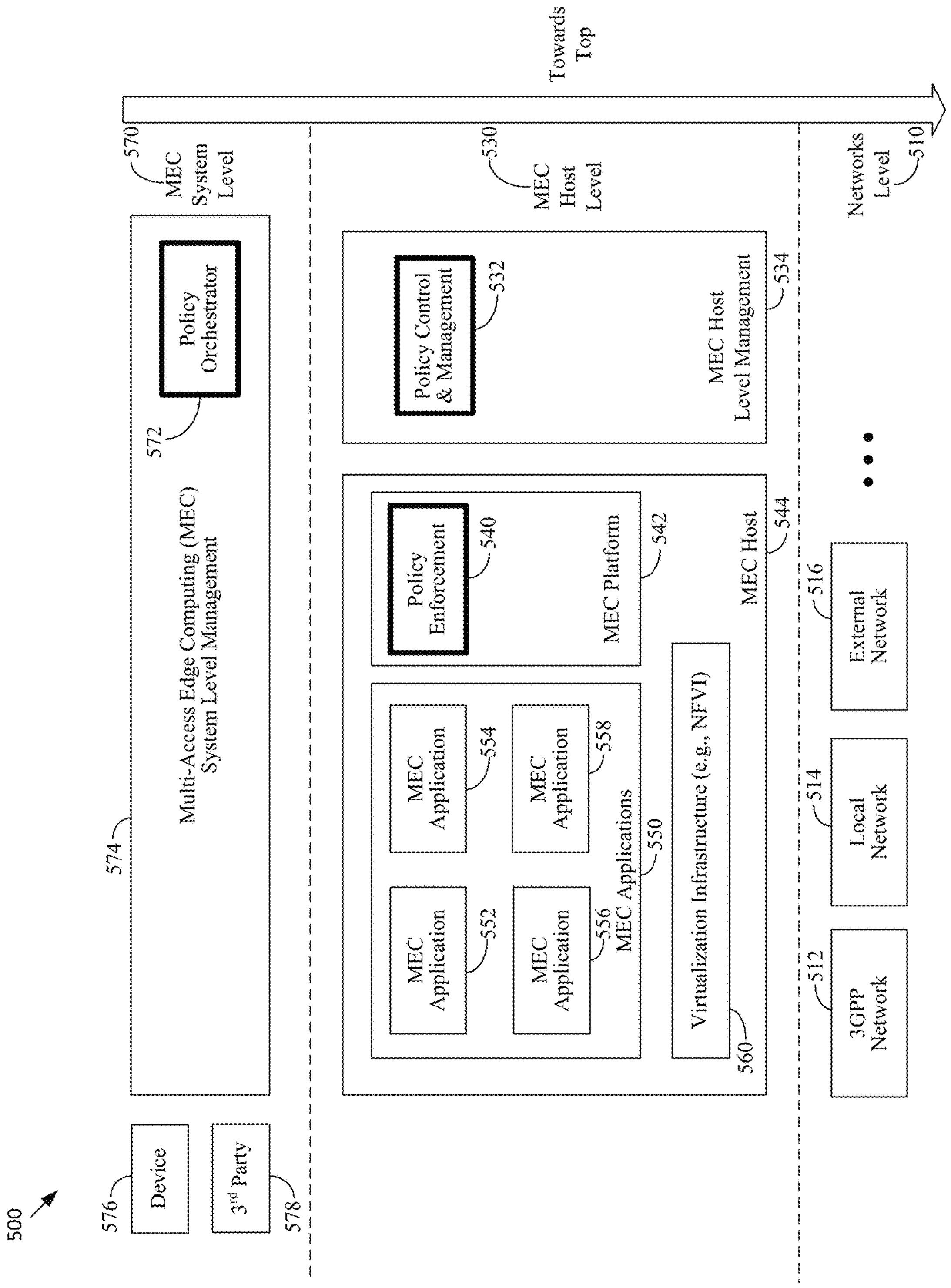
FIG. 5 is a system level diagram of a Policy Orchestrator employed at a Multi-Access Edge Computing (MEC) Platform according to at least one embodiment.

FIG. 5 is a system level diagram of a Policy Orchestrator employed at a Multi-Access Edge Computing (MEC) Platform 500 according to at least one embodiment.

In FIG. 5, MEC Platform 500 provides a standardized, open environment for efficient and seamless integration of applications from vendors, service providers, and third-parties across multi-vendor computing platforms at the edge of mobile networks. MEC Platform 500 uses a MEC framework that includes three levels: Networks Level 510, MEC Host Level 530, and MEC System Level 570. The position of the Policy Orchestrator 572 in MEC System Level Management 574 at MEC System Level 570 is illustrated relative to communication with Policy Control and Management 532 in MEC Host Level Management 534 and Policy Enforcement 540 in MEC Platform 542.

Policy Orchestrator 572 is provided by MEC System Level Management entity 574. MEC System Level Management entity 574 interfaces with external Devices 576 and 3$^{rd}$ Party applications 578. Policy Orchestrator 572 is thus implemented at the MEC System Level 570 where the Policy Orchestrator 572 provides a policy framework, analyzes applications, and implements the appropriate services. Policy Control and Management 532 is implemented at MEC Host Level Management 534 at the MEC Host Level 530. Policy Enforcement 540 is also implemented at the MEC Host Level 530 on the MEC Platform 542 of MEC Host 544.

Policy Orchestrator 572 assumes that the network is more application centric than connectivity centric as the case is in current networks. To support application centric policies, Policy Orchestrator 572 provides the service specific requirements in an end-to-end point of view of the network. The network resources are coordinated by the Policy Orchestrator 572 to support the particular service for the specific requirements of an application. Policies are applied or implemented within existing platforms that are in current use in current networks. For a cloud platform, for example, a concept referred to a Multi-Access Edge Computing (MEC) is involved, where at the Network Level 510, network functions are applied to network components, such as routers, gateways, firewalls, etc. Network Level 510 is able to include a 3GPP Network 512, a Local Network 514, an External Network 516, etc.

Policy Orchestrator 572 interacts with functions of Policy Control and Management 532 in the MEC Host Level 530, and the Policy Control and Management 532 interact with the MEC Platform 542, where the functionality for the Policy Enforcement 540 is provided. Policy Enforcement 540 is implemented at the MEC Platform 542 as part of MEC Host 544. MEC applications 550, such as MEC Applications 552, 554, 556, 558, are implemented at the MEC Host 544 to implement network functions. Virtualization Infrastructure 560, e.g., NFVI, is also implemented at the MEC Host 544.

At a base level, the Policy Orchestrator 572 provides network functions as well as node/network level resources and services for Network Functions, including Physical Network Functions (PNFs), Virtual Network Functions (VNFs), and Cloud-Native Functions (CNFs). PNFs refers to hardware that provides specific networking function. Virtual Network Functions (VNFs) are software applications that deliver network functions. VNFs are deployed as virtual machines (VMs) to provide the digital transformation from the Physical Network Functions (PNFs) of legacy network appliances on proprietary hardware. VNFs are built on top of Virtualization Infrastructure 560, such as NFVI, including a Virtual Infrastructure Manager (VIM) to allocate resources, such as computing, storage, and networking. The framework for managing Virtualization Infrastructure 560 and provisioning new NFs occurs in the Management, Automation, and Network Orchestration (MANO) elements defined by NFV. Cloud-Native Functions (CNFs) uses containers rather than VMs. Containers allow users to package software, such as applications, functions, or microservices, with the files used to run the software, while sharing access to the operating system and other server resources. CNFs facilitate moving contained component among environments (e.g., development, test, production, etc.), and among clouds while retaining full functionality.

At a top level, the Policy Orchestrator 572 is able to control uses cases, applications, network slicing, etc. The Policy Orchestrator 572 is able to be aligned for an independent isolated network. The Policy Orchestrator 572 is also able to support dynamic network slicing including slicing internals. Deployment and implementation of the Policy Orchestrator 572 is able to be configured to enhance a policy framework with top-to-bottom, end-to-end visibility of the network. For example, the different levels of enforcement and policy decisions are able to be defined to provide improved visibility of resources and service requirements. The Policy Orchestrator 572 provides metadata for intercommunication of various layer of policy nodes, which helps for direct, transparent and redirect communication among different nodes from top-to-bottom and vice-a-versa. Policy Orchestrator 572 also provides a standardized template to communicate policy-specific indications at various levels (e.g., top-to-bottom) that are distributed end-to-end across the network.

Figure 6:
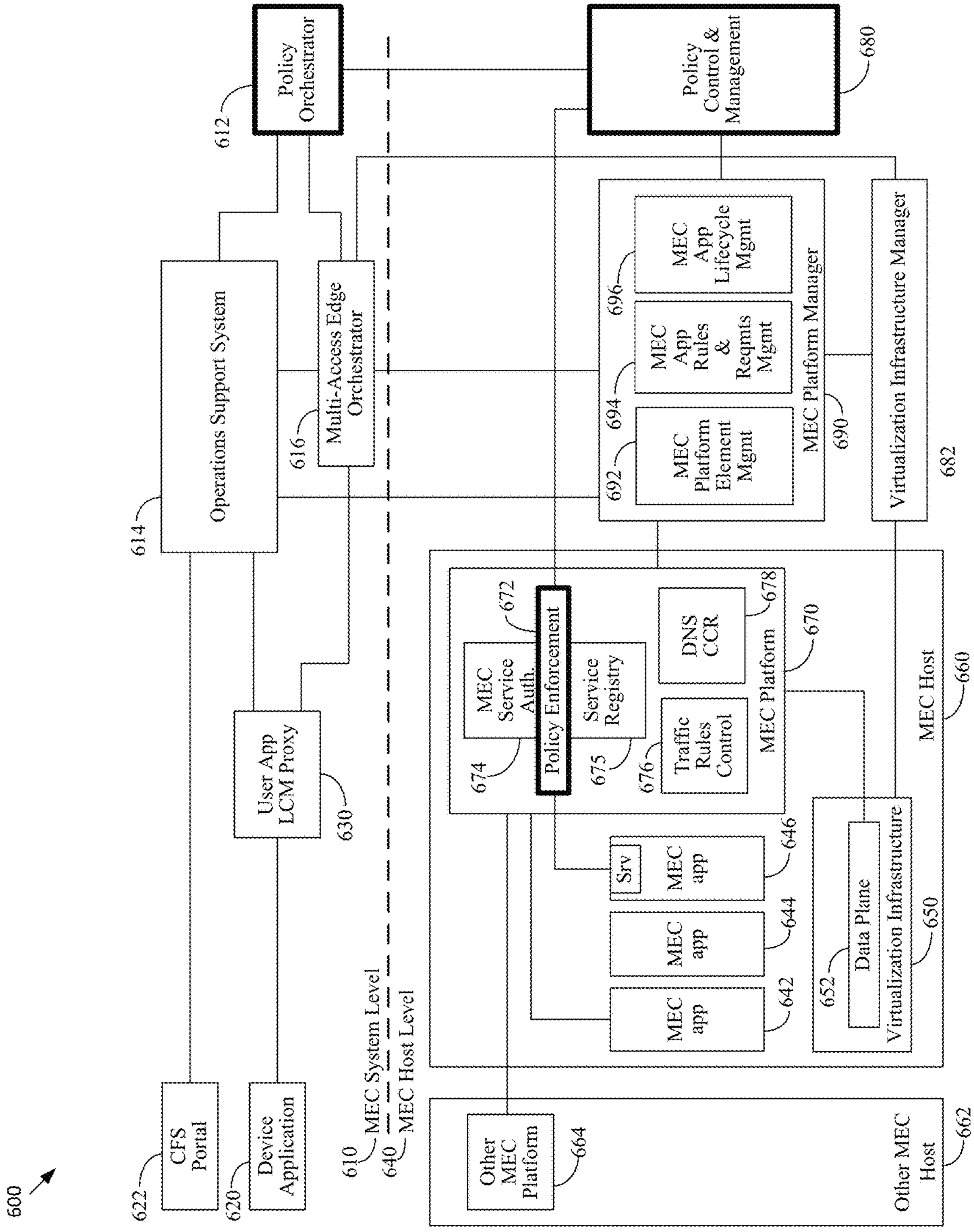
FIG. 6 is a detail system level diagram of a Multi-Access Edge Computing (MEC) System according to at least one embodiment.

FIG. 6 is a detail system level diagram of a Multi-Access Edge Computing (MEC) System 600 according to at least one embodiment.

In FIG. 6, at the MEC System Level 610, Policy Orchestrator 612 interacts with the Operations Support System 614 and the Multi-Access Edge Orchestrator 616. Policy Orchestrator 612 also interacts with Policy Control and Management 680 and Policy Enforcement 672 in MEC Platform 670.

The Multi-Access Edge Orchestrator 616 provides support for the MEC Platform Manager 690 and is not related to the Policy Orchestrator 612. Policy Orchestrator 612 also interacts with Policy Control and Management 680. Policy Control and Management 680 interacts with the Platform Manager 670 and also directly with the Policy Enforcement 672 at MEC Host 660.

Device applications 620 are applications in the device (e.g., UE, laptop with internet connectivity) that have the capability to interact with the MEC System 600 via a user application lifecycle management proxy. Customer Facing Service (CFS) Portal 622 allows third-party customers (e.g. commercial enterprises) to select and order a set of MEC applications that meet predetermined specifications, and to receive back service level information from the provisioned applications. The User Application Lifecycle Management (LCM) Proxy 630 allows device applications to request on-boarding, instantiation, termination of user applications, and when supported.

At the MEC Host Level 640, MEC applications 642, 644, 646 run as virtual machines (VM) on top of Virtualization Infrastructure 650 provided by the MEC Host 660, and interact with the MEC Platform 670 to consume and provide MEC services. Virtualization Infrastructure 650 includes Data Plane 652 that enforces the forwarding rules received by the MEC Platform 670 and routes the traffic between the applications, services and the networks.

MEC Platform 670 supports MEC Service Authorizations 674, Service Registry 675, Traffic Rules 676, and DNS Configuration and Conflict Resolution 678. MEC Applications 642, 644, 646 also interact with the MEC Platform 670 to perform certain support procedures related to the lifecycle of the application, such as indicating availability, preparing relocation of user state, etc. MEC Applications 642, 644, 646 include a certain number of rules and associated requirements, such as resources to be used, maximum latency, services, etc. These requirements are validated by the MEC System Level Management 680, and are assigned to default values in response to the requirements missing.

Multi-Access Edge Orchestrator 616 maintains an overall view of the MEC System 600 based on deployed MEC Hosts 660, available resources, available MEC services, and topology. Other MEC Hosts 662 having Other MEC Platforms 664 communicate with MEC Platform 670. Multi-Access Edge Orchestrator 616 supports on-boarding of application packages, including checking the integrity and authenticity of the packages, validating application rules and requirements and adjusting the application rules and requirements to comply with operator policies, keeping a record of on-boarded packages, and preparing the virtualization infrastructure manager(s) to handle the applications. Multi-Access Edge Orchestrator 616 selects appropriate MEC host(s) 660, 662 for application instantiation based on constraints, such as latency, available resources, and available services, triggers application instantiation and termination, and is able to trigger application relocation. MEC Host 660 is also able to interact with Other MEC Hosts 662 with their own MEC Platforms 664.

MEC Platform Manager 690 performs MEC Application Lifecycle Management, including informing the multi-access edge orchestrator of relevant application related events, provides MEC Platform Element Management functions 692 to the MEC Platform 670 and provides MEC Application Rules and Requirements Management 694. The MEC App Lifecycle Management 696 is responsible for instantiating, terminating and relocating a MEC Applications 642, 644, 646, as well as providing indications to the Multi-Access Edge Orchestrator 616 on some application related events. MEC Platform Manager 690 also receives virtualized resource fault reports and performance measurements from the Virtualization Infrastructure Manager 682 for further processing. Virtualization Infrastructure Manager 682 is used to allocate, manage and release virtualized (compute, storage and networking) resources of the virtualization infrastructure, and to prepare the virtualization infrastructure to run a software image. The preparation includes configuring the infrastructure, and receiving and storing the software image. Virtualization Infrastructure Manager 682 collects and reports performance and fault information about the virtualized resources.

Policy Orchestrator 612 provides a policy framework, analyzes applications, and implements the appropriate services. Policy Orchestrator 612 interacts with functions of Policy Control and Management 680, and the Policy Control and Management 680 interact with Policy Enforcement 672 at the MEC Platform 678. Policy Orchestrator 612 provides the service specific requirements in an end-to-end point of view of the network. The network resources are coordinated by the Policy Orchestrator 612 to support the particular service for the specific requirements of an application. Policies are applied or implemented within existing platforms that are in current use in current networks. Policy Orchestrator 612 provides network functions as well as node/network level resources and services for Network Functions. Policy Orchestrator 612 is able to control uses cases, applications, network slicing, etc. The Policy Orchestrator 612 is able to be aligned for an independent isolated network. The Policy Orchestrator 612 is also able to support dynamic network slicing including slicing internals. Deployment and implementation of the Policy Orchestrator 612 is able to be configured to enhance a policy framework with top-to-bottom, end-to-end visibility of the network. For example, the different levels of enforcement and policy decisions are able to be defined to provide improved visibility of resources and service requirements. Policy Orchestrator 612 provides metadata for intercommunication of various layer of policy nodes, which helps for direct, transparent and redirect communication among different nodes from top-to-bottom and vice-a-versa. Policy Orchestrator 612 also provides a standardized template to communicate policy-specific indications at various levels (e.g., top-to-bottom) that are distributed end-to-end across the network.

Figure 7:
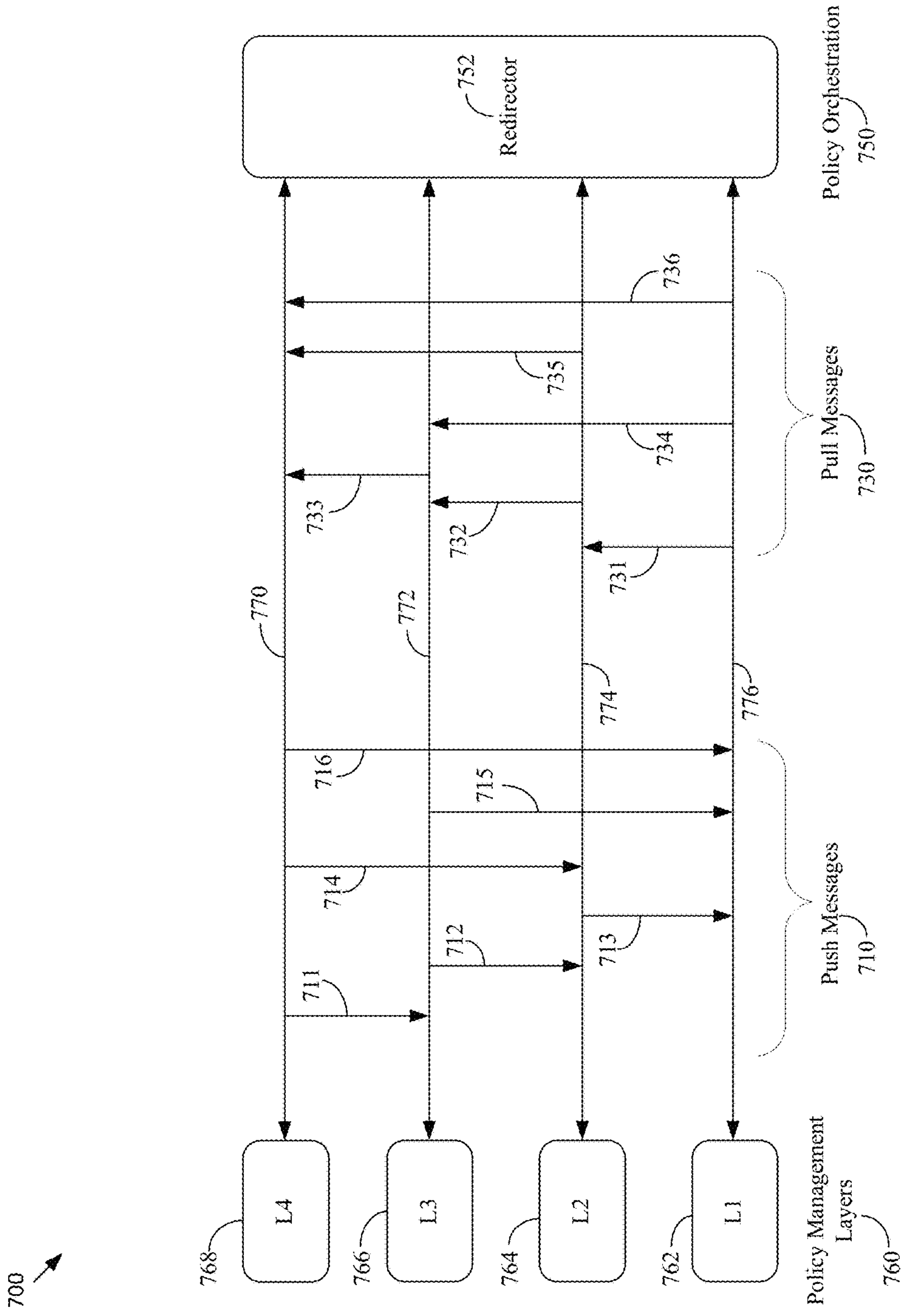
FIG. 7 is a view of messages supported by the Policy Orchestrator according to at least one embodiment.

FIG. 7 is a view of messages 700 supported by the Policy Orchestrator according to at least one embodiment.

In FIG. 7, two sets of messages, Push Messages 710 and Pull Messages 730, are supported by Policy Orchestrator 750. Policy Management Layers 760 include Layer 1 762, Layer 2 764, Layer 3 766, and Layer 4 768. Policy Orchestrator 750 communicates between different levels for policy push and resource and service level understanding. The dynamic framework provided by the Policy Orchestrator 760 provides flexibility on network policy architecture and effective enforcement.

Push Messages 710 are messages that provide service requirements or specific details that are pushed from one entity to another depending on which entity to which entity communication occurs.

Pull Messages 730 are queries that a particular entity is able to make with different entities for obtaining certain information. Queries for specific policies regarding underlying resources and service requirements are able to be generated bottom-to-top and top-to-bottom. The information is able to be resource specific, such as information regarding the availability of the resource or the applied policy depending on from which entity to which entity the message is being communicated. Policy Orchestrator operates at the four different levels discussed above with reference to FIG. 4. Different level entities have a Policy Control and Management function associated with that level.

The Push Messages 710 and the Pull Messages 730 use existing protocols. Thus, Push Messages 710 and the Pull Messages 730 do not involve new methods or communication protocols, but include information that is communicated for support policy orchestration by Policy Orchestrator 750. Layer 4 768, which is the Policy Control and Management layer at the top, is used by an application to set the layer that is managing the application or defining the application services the application is able to push that service requirement in Message 711 to Layer 3 766, which is the network layer that corresponds to the PCF at the Core Network or the RIC at the RAN. Layer 4 768 is also able to directly push Message 714 to Layer 2 764 or Message 716 to Layer 1 762, depending on policy requirements or service requirements. Layer 1 762 is the Platform/System Level. Layer 3 766 is able to push Message 712 to Layer 2 and Message 715 to Layer 1 762. Layer 2 764 is able to push Message 713 to Layer 1 762. Thus, FIG. 7 shows Push Messages 710 and Pull Messages 730 being communicating directly between any of the layers, depending on what kind of message parameters the Layers want to share.

Similarly, Layer 1 762 is able to send Pull Message 731 to Layer 2 764, Pull Message 734 to Layer 3 766, and Pull Message 736 to Layer 4 768. Layer 2 764 is able to send Pull Message 732 to Layer 3 766, and Pull Message 735 to Layer 4 768. Layer 3 is able to send Pull Message 733 to Layer 4 768.

A Redirector 752 role of Policy Orchestration 750 sits at the top and has end-to-end visibility from the lead Policy Control and Management layers and helps to redirect those messages, e.g., from Layer 4 768 to Layer 2 764. For example, in response to Layer 4 768 wanting to send certain service requirement, and in response to Layer 4 768 having the knowledge or the information that this could be satisfied over Layer 2 764, Layer 4 768 sends message to L2. L4 is also able to send Message 770 to Redirector 752, wherein Redirector 752 redirects Messages 770 as Message 774 to Layer 764 based on the end-to-end visibility. The redirector is implemented by the Policy Orchestrator. Redirector 750 is also able to use Message 772 with Layer 3 766 and Message 776 with Layer 1 762. Thus, Redirector 750 is able to receive Messages 770, 772, 774, 776 from Layer 4 768, Layer 3 766, Layer 2 764, and Layer 1 762, respectively. Redirector 750 is able to send Messages 770, 772, 774, 776 to Layer 4 768, Layer 3 766, Layer 2 764, and Layer 1 762, respectively.

Figure 8:
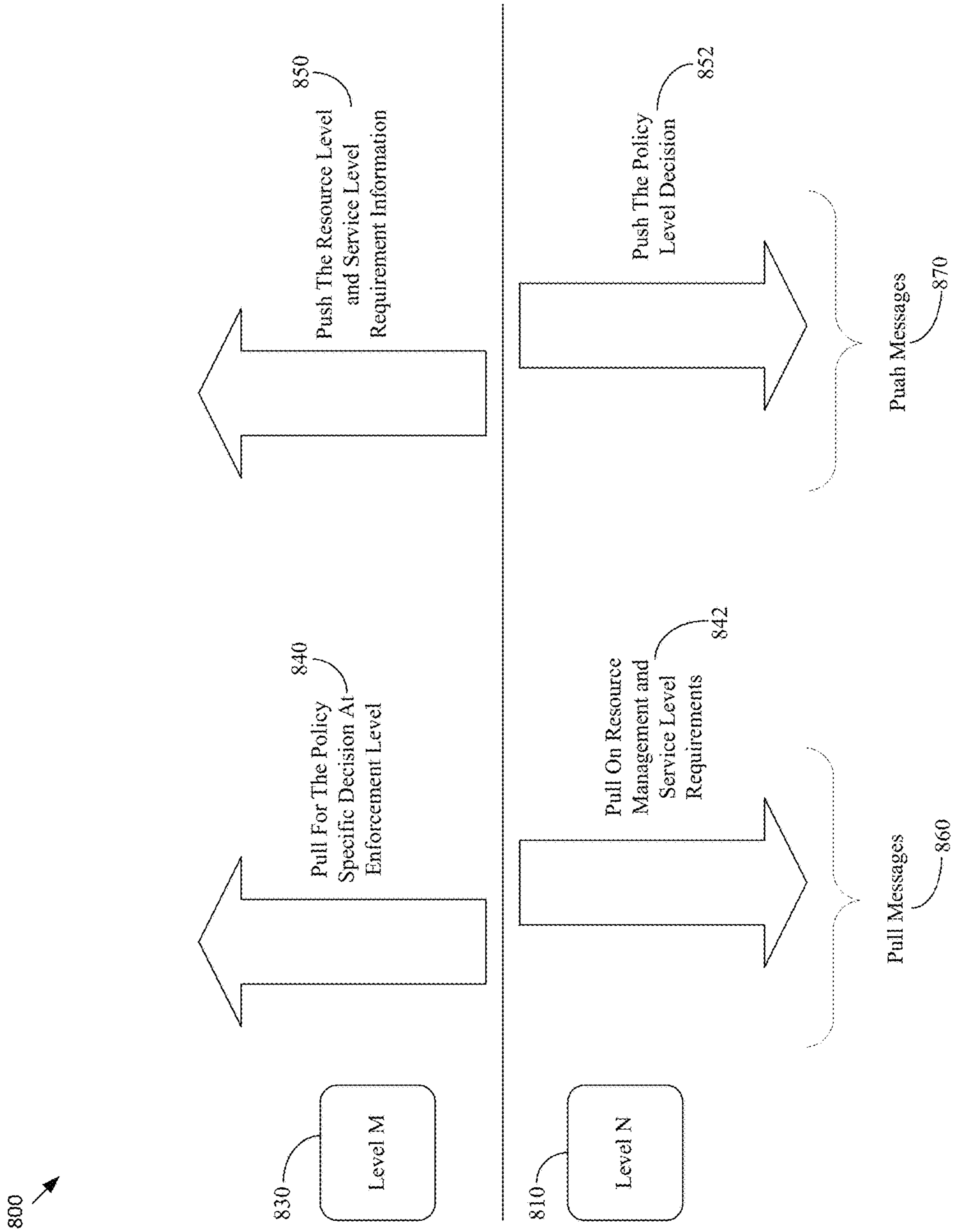
FIG. 8 shows Pull Messages and Push Messages interaction according to at least one embodiment.

FIG. 8 shows Pull Messages and Push Messages interaction 800 according to at least one embodiment.

In FIG. 8, two levels are shown, Level N 810 and Level M 830. An upper level, as compared to Level N 810, is represented as Level M 830, where M is greater than N. Level N 810 is able to use a Pull Message 840 to pull from Level M 830 a policy specific decision to enforce at the enforcement level. Level M 830 is able to use a Pull Message 842 to pull from Level N 810 resource management and service level requirements.

Similarly, Level N 810 is able to use a Push Message 850 to push to Level M 830 a resource management and service level requirements. Level M 830 is able to use a Push Message 852 to push to Level N 810 the policy level decision. Thus, Pull Messages 860 and Push Messages 870 are able to be between Level 1, Level 2, Level 3, and Level 4. Further, there may be a greater or lesser number of layers, such as 3 or 5.

As described above, Pull Messages 860 are queries and Push Messages 870 are used to provide certain parameters for specific requirements to enforce. For example for Push Messages 860 for pushing a policy level decisions, Level M 830 is pushing certain policy level decision for level N 810, e.g., Push Message 842 from the higher layer to lower layer. Similarly, for pushing resource level and service level requirement information, Push Message 840 is sent from Level N 810 to Level M 830, e.g., a lower layer to an upper layer.

Similarly, Pull Message 850 are able to be sent from Level N 810 to Layer M 830 to pull a policy specific decision, e.g., from a lower layer to an upper layer.

Pull Message 852 is able to be sent from Level M 830 to Level N 810 to pass resource management and service level requirements, e.g., from a higher layer to a lower layer.

Figure 9:
FIG. 9 illustrates metadata for Pull Messages and Push Messages according to at least one embodiment.

FIG. 9 illustrates metadata for Pull Messages and Push Messages 900 according to at least one embodiment.

In FIG. 9, examples for a hierarchal layer for Pull Messages 910 and Push Messages 960 are shown. Those skilled in the art understand that the format and structure of elements are implementation specific.

For a Push Message 910 used for Policy Enforcement, metadata for Hierarchal Level 920, Routing Component 930, and Policy Management Node Identifier 940 are shown. For the Hierarchal Level 920 of a Push Message 910, the metadata specifies a Source (Src) Level 922 and Destination Level 924. For the Routing Component 930 of a Push Message 910, the metadata includes the Source (Src) Realm 932 and the Destination Realm 934. For the Policy Management Node Identifier 940 of a Push Message 910, the metadata provides Source (Src) Level Policy Node 942, and Destination Policy Node 944. Other metadata for a Push Message includes Enforcement Node 950, Service Level Requirement 952, Resource Status 954, etc.

For the Hierarchal Level 920 of a Pull Message 960 for Resource Assessments, the metadata specifies a Source (Src) Level 926 and Destination Level 928. For the Routing Component 930 of a Pull Message 960, the metadata includes the Source (Src) Realm 936 and the Destination Realm 938. For the Policy Management Node Identifier 940 of a Pull Message 960, the metadata provides Source (Src) Level Enforcement Node 946, and Destination Enforcement Node 948. Other metadata for a Pull Message 960 includes Policy Node 970, Service Level Requirement 972, Resource Status 974, etc. Different policies are able to be provided for different cloud platforms because different network functions are able to be running on the different cloud platforms. The Service Level Requirement 952 972, and the Resource Status 954, 974 include the policy specific parameters that are sent. Policy specific parameters are implementation specific.

Figure 10:
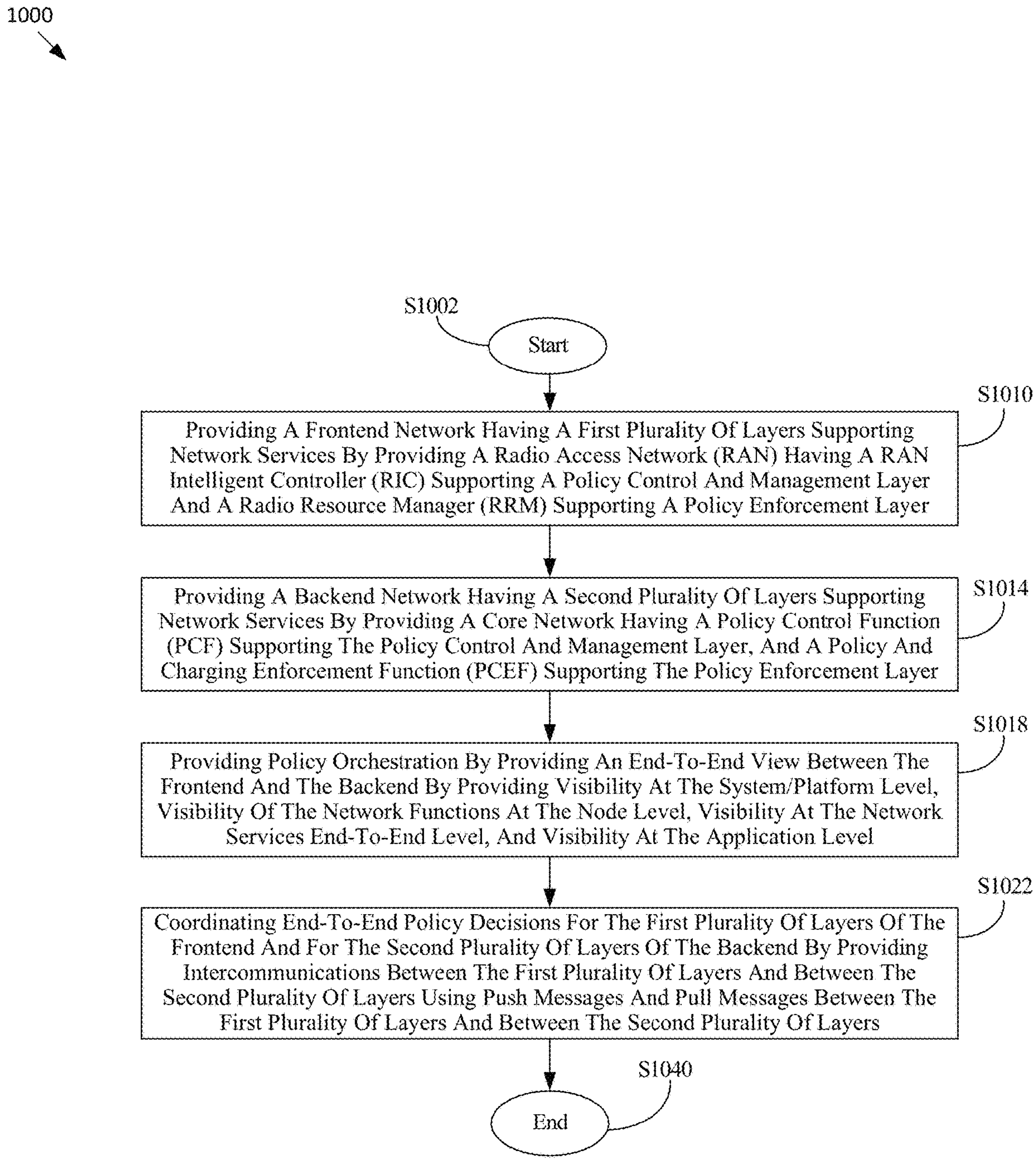
FIG. 10 is a flowchart of a method for providing a policy orchestration framework to support an end-to-end (E2E) policy architecture with top to bottom policy orchestration according to at least one embodiment.

FIG. 10 is a flowchart 1000 of a method for providing a policy orchestration framework to support an end-to-end (E2E) policy architecture with top to bottom policy orchestration according to at least one embodiment.

In FIG. 10, the method starts S1002 and a frontend network is provided having a first plurality of layers supporting network services, wherein the frontend network is a Radio Access Network (RAN) having a RAN Intelligent Controller (RIC) supporting a policy control and management layer and a Radio Resource Manager (RRM) supporting a policy enforcement layer S1010. Referring to FIG. 3, Policy Orchestrator 310 coordinates policies top-to-bottom and end-to-end between a frontend and a backend. A frontend network is referred to as a Radio Access Network (RAN) 350. The backend network is referred to as a Core Network 360. The RAN 350 provides a Policy Control and Management Layer 330 via a RAN Intelligent Controller (RIC) 332, and a Policy Enforcement Layer 340 via the Radio Resource Management (RRM) 342. The RIC 332 performs Resource Management and Coordination for the RAN 350. The RIC 332 manages the network node resources and controls the network node resources intelligently. At the Policy Enforcement Layer 340 on the RAN 350, the RRM 334 enforces policy decisions specified by at the Policy Control and Management Layer 330. Because the frontend provided by the RAN 350 and the backend provided by the Core Network 360 are two independent entities, the policy applied to the Core Network 360 is independent of the policy applied at the RAN 350.

A backend network is provided having a second plurality of layers supporting network services, wherein the backend network is a Core Network having a Policy Control Function (PCF) supporting the policy control and management layer, and a Policy and Charging Enforcement Function (PCEF) supporting the policy enforcement layer S1014. Referring to FIG. 3, Policy Orchestrator 310 coordinates policies top-to-bottom and end-to-end between a frontend and a backend. The backend network is referred to as a Core Network 360. The Core Network 360 provides a Policy Control and Management Layer 330 via a Policy Control Function (PCF) 334, and a Policy Enforcement Layer 340 via the Policy and Charging Enforcement Function (PCEF) 344. The PCF 334 on the Core Network 360 performs Resource Management and Coordination, manages network node resources, and controls the network node resources. The PCEF 344 on the Core Network 360 enforces policy decisions specified by at the Policy Control and Management Layer 330 of the Core Network 360. Because the frontend provided by the RAN 350 and the backend provided by the Core Network 360 are two independent entities, the policy applied to the Core Network 360 is independent of the policy applied at the RAN 350.

Policy Orchestration provides an end-to-end view between the frontend and the backend by providing visibility at the System/Platform level, visibility of the network functions at the node level, visibility at the network services end-to-end level, and visibility at the application level S1018. Referring to FIG. 4, the vertical cross section view of the system is layered in four different levels for policy orchestration point of view. The Policy Orchestrator provides visibility of the network through the Use Cases of Applications level 410, the Network Service End-to-End level 420, the Network Node or Network Function level 430, and the System/Platform level 440. Visibility of the applications that are running over the network are provided. At the Use Cases or Application level 410, the Policy Orchestrator according to at least one embodiment provides visibility of use case level 412, network slicing 414, applications 416, etc. For example, certain access networks involve fiber at the home and connecting to home Wi-Fi. At the Network Service End-to-End level 420, the Policy Orchestrator according to at least one embodiment provides visibility of network services 422, end-to-end bearers 424, etc. At the Network Node or Network Function level 430, the Policy Orchestrator according to at least one embodiment provides visibility of nodes 432, service differentiation 434, etc. For example, visibility of different network nodes, such as particular gateways or routers that are involved. At the System/Platform level 440, the Policy Orchestrator according to at least one embodiment provides visibility of the platform 442, the infrastructure 444, resources 446, etc. For example, visibility of the computing platform is a particular router. The Policy Orchestrator applies a policy at the levels of the functions that are running to support an application.

The policy orchestrator coordinates end-to-end policy decisions for the first plurality of layers of the frontend and for the second plurality of layers of the backend by providing intercommunications between the first plurality of layers and between the second plurality of layers using Push Messages and Pull messages between the first plurality of layers and between the second plurality of layers S1022. Referring to FIG. 3, the Policy Orchestrator 310 according to at least one embodiment provides coordination between the Policy Control and Management Layer 330 and the Policy Enforcement Layer 340 of the RAN 350 and the Policy Control and Management Layer 330 and the Policy Enforcement Layer 340 of the Core Network 360 so that the decision of the policy that is taken is based on the end-to-end visibility of the resources within the network. Policy Orchestrator 310 coordinates policies top-to-bottom and end-to-end in the RAN 350 and the Core Network 360 using Push/Pull Messages 370 and Push/Pull Messages 372, respectively.

The process then terminates S1040.

At least one embodiment of the method for providing a policy orchestration framework to support an end-to-end (E2E) policy architecture with top to bottom policy orchestration includes providing a frontend network having a first plurality of layers supporting network services, providing a backend network having a second plurality of layers supporting the network services, and providing policy orchestration by providing an end-to-end view between the frontend network and the backend network, and coordinating end-to-end policy decisions for the first plurality of layers of the frontend network and for the second plurality of layers of the backend network.

Figure 11:
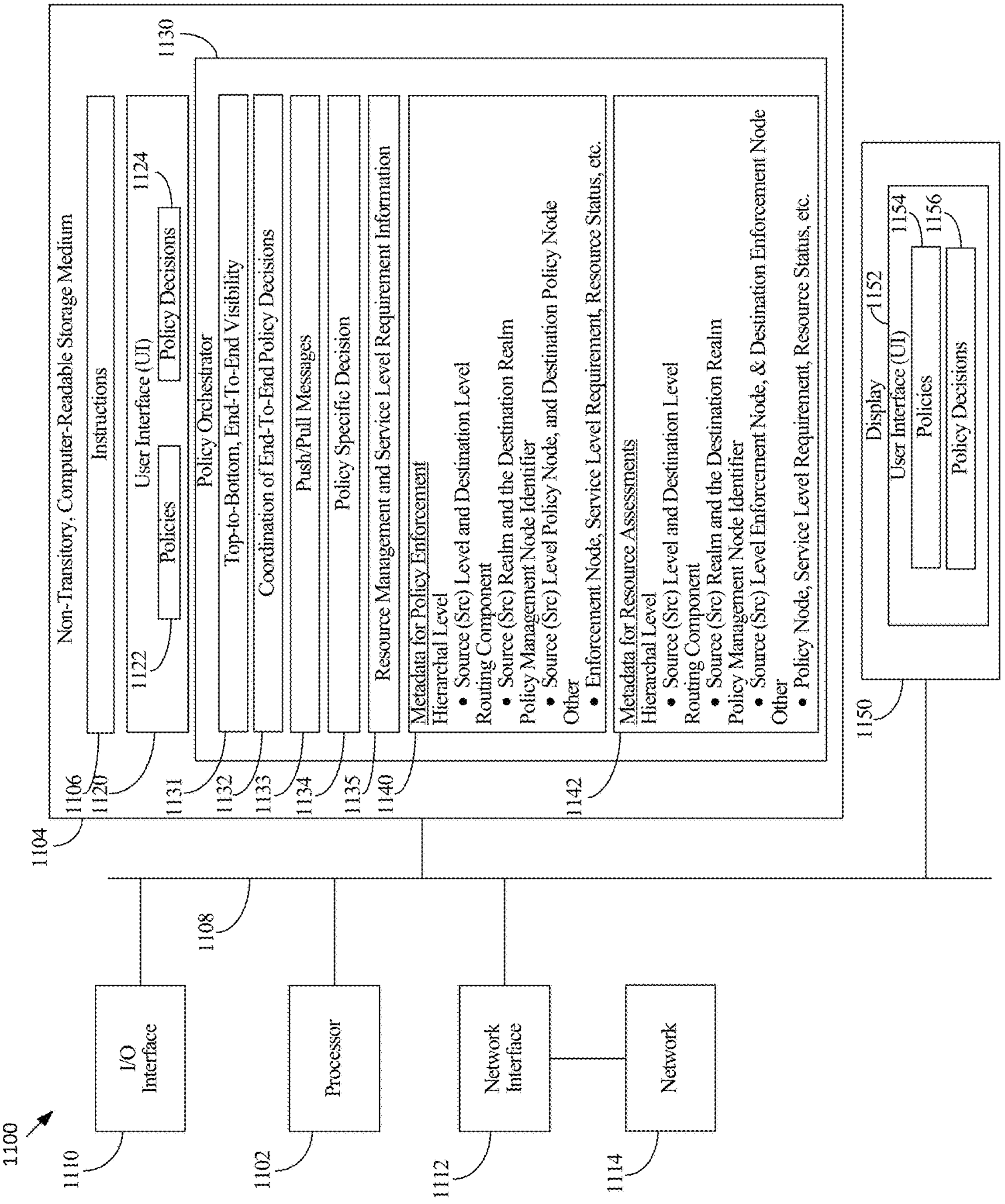
FIG. 11 is a high-level functional block diagram of a processor-based system according to at least one embodiment.

FIG. 11 is a high-level functional block diagram of a processor-based system 1100 according to at least one embodiment.

In at least one embodiment, processing circuitry 1100 provides a policy orchestration framework to support an end-to-end (E2E) policy architecture with top to bottom policy orchestration. Processing circuitry 1100 implements a policy orchestration framework to support an end-to-end (E2E) policy architecture with top to bottom policy orchestration using Processor 1102. Processing circuitry 1100 also includes a Non-Transitory, Computer-Readable Storage Medium 1104 that is used to implement a policy orchestration framework to support an end-to-end (E2E) policy architecture with top to bottom policy orchestration. Non-Transitory, Computer-Readable Storage Medium 1104, amongst other things, is encoded with, i.e., stores, Instructions 1106, i.e., computer program code, that are executed by Processor 1102 causes Processor 1102 to perform operations for a policy orchestration framework to support an end-to-end (E2E) policy architecture with top to bottom policy orchestration. Execution of Instructions 1106 by Processor 1102 represents (at least in part) an application which implements at least a portion of the methods described herein in accordance with one or more embodiments (hereinafter, the noted processes and/or methods).

Processor 1102 is electrically coupled to Non-Transitory, Computer-Readable Storage Medium 1104 via a Bus 1108. Processor 1102 is electrically coupled to an Input/Output (I/O) Interface 1110 by Bus 1108. A Network Interface 1112 is also electrically connected to Processor 1102 via Bus 1108. Network Interface 1112 is connected to a Network 1114, so that Processor 1102 and Non-Transitory, Computer-Readable Storage Medium 1104 connect to external elements via Network 1114. Processor 1102 is configured to execute Instructions 1106 encoded in Non-Transitory, Computer-Readable Storage Medium 1104 to cause processing circuitry 1100 to be usable for performing at least a portion of the processes and/or methods. In one or more embodiments, Processor 1102 is a Central Processing Unit (CPU), a multi-processor, a distributed processing system, an Application Specific Integrated Circuit (ASIC), and/or a suitable processing unit.

Processing circuitry 1100 includes I/O Interface 1110. I/O interface 1110 is coupled to external circuitry. In one or more embodiments, I/O Interface 1110 includes a keyboard, keypad, mouse, trackball, trackpad, touchscreen, and/or cursor direction keys for communicating information and commands to Processor 1102.

Processing circuitry 1100 also includes Network Interface 1112 coupled to Processor 1102. Network Interface 1112 allows processing circuitry 1100 to communicate with Network 1114, to which one or more other computer systems are connected. Network Interface 1112 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 1100 is configured to receive information through I/O Interface 1110. The information received through I/O Interface 1110 includes one or more of instructions, data, design rules, libraries of cells, and/or other parameters for processing by Processor 1102. The information is transferred to Processor 1102 via Bus 1108. Processing circuitry 1100 is configured to receive information related to a User Interface (UI) through I/O Interface 1110. The information is stored in Non-Transitory, Computer-Readable Storage Medium 1104 as UI 1122.

In one or more embodiments, one or more Non-Transitory, Computer-Readable Storage Medium 1104 having stored thereon Instructions 1106 (in compressed or uncompressed form) that may be used to program a computer, processor, or other electronic device) to perform processes or methods described herein. The one or more Non-Transitory, Computer-Readable Storage Medium 1104 include one or more of an electronic storage medium, a magnetic storage medium, an optical storage medium, a quantum storage medium, or the like.

For example, the Non-Transitory, Computer-Readable Storage Medium 1104 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 1104 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 1104 stores Instructions 1106 configured to cause Processor 1102 to perform at least a portion of the processes and/or methods for a policy orchestration framework to support an end-to-end (E2E) policy architecture with top to bottom policy orchestration. In one or more embodiments, Non-Transitory, Computer-Readable Storage Medium 1104 also stores information, such as algorithm which facilitates performing at least a portion of the processes and/or methods for a policy orchestration framework to support an end-to-end (E2E) policy architecture with top to bottom policy orchestration.

Accordingly, in at least one embodiment, Processor 1102 executes Instructions 1106 stored on the one or more Non-Transitory, Computer-Readable Storage Medium 1104 to implement a User Interface 1120 that presents Policies 1122 and Policy Decisions 1124. Processor 1102 implements a Policy Orchestrator 1130. Policy Orchestrator 1130 provides a Top-To-Bottom, End-To-End View 1131 of the network for orchestrating policies. Policy Orchestrator 1130 provides Coordination Of End-To-End Policy Decisions 1132 between the layers of a Radio Access Network and a Core Network so that the decision of the policy that is taken is based on the end-to-end visibility of the resources within the network. Policy Orchestrator 1130 provides metadata for intercommunication of various layer of policy nodes using Push Messages and Pull Message 1133, which are sued for direct, transparent and redirect communication among different nodes from top-to-bottom and vice-a-versa. Processor 1102 implements Policy Orchestrator 1130 to provide different policies for different cloud platforms because different network functions are able to be running on the different cloud platforms. Policy Orchestrator 1130 is able to determine Policy Specific Decisions 1134, and Resource Management and Service Level Requirement Information 1135 that are coordinated end-to-end between layers of a network. Policy Orchestrator 1130 implemented by Processor 1102 provides metadata for Push and Pull Messages, including metadata for Hierarchal Level information, Routing Component information, and Policy Management Node Identifiers. Metadata for Policy Enforcement 1140 includes Hierarchal Level information that specifies a Source (Src) Level and Destination Level, Routing Component information that includes the Source (Src) Realm and the Destination Realm, and Policy Management Node Identifier information that includes Source (Src) Level Policy Node, and Destination Policy Node. Other metadata includes Enforcement Node, Service Level Requirement, Resource Status, etc. Metadata for Resource Assessments 1142 includes Hierarchal Level information specifies a Source (Src) Level and Destination Level, Routing Component information that includes the Source (Src) Realm and the Destination Realm, and Policy Management Node Identifier information that includes Source (Src) Level Enforcement Node, and Destination Enforcement Node. Other metadata includes Policy Node, Service Level Requirement, Resource Status, etc. Processor 1102 presents a User Interface 1152 on Display 1150, including Policies 1154 and Policy Decisions 1156.

Embodiments described herein provide a method that provides one or more advantages. For example, a Policy Orchestrator according to at least one embodiment provides a top-to-bottom policy architecture for multi access networks. Policy Orchestrator according to at least one embodiment provide a framework for coordination of various policy specific network entities. The Policy Orchestrator provides end-to-end visibility of network capabilities and applies policies for specific services. The Policy Orchestrator according to at least one embodiment enables a network to apply and manage policies on various grades and levels of services for better service delivery and network performance.

An aspect of this description is directed to a method [1] for providing a policy orchestration framework to support an end-to-end (E2E) policy architecture with top to bottom policy orchestration includes providing a frontend network having a first plurality of layers supporting network services, providing a backend network having a second plurality of layers supporting the network services, and providing policy orchestration by providing an end-to-end view between the frontend network and the backend network, and coordinating end-to-end policy decisions for the first plurality of layers of the frontend network and for the second plurality of layers of the backend network based on the end-to-end view.

The method described in [1], wherein the providing an end-to-end view between the frontend network and the backend network includes providing visibility at a System/Platform level, visibility of network functions at a node level, visibility at a network services end-to-end level, and visibility at an application level.

The method described in [1] to [2], wherein the coordinating the policies between the first plurality of layers of the frontend network and the second plurality of layers of the backend network includes providing intercommunications between the first plurality of layers and between the second plurality of layers.

The method described in [1] to [3], wherein the providing intercommunications between the first plurality of layers and between the second plurality of layers includes providing Push Messages and Pull messages between the first plurality of layers and between the second plurality of layers.

The method described in [1] to [4], wherein the providing Push Messages and Pull messages between the first plurality of layers and between the second plurality of layers includes one of providing a Pull Message communicated from a lower level to an upper level to obtain a policy specific decision at an enforcement level, providing a Pull Message communicated from the upper level to the lower level to obtain resource level and service level requirement information, providing a Push Message communicated from the lower level to the upper level to provide the resource level and service level requirement information, or providing a Push Message communicated from the upper level to the lower level to provide the policy specific decision.

The method described in [1] to [5], wherein the providing the policy orchestration includes providing the policy orchestration at a multi-access level management entity providing cloud-computing capabilities at an edge of the network.

The method described in [1] to [6], wherein the providing the frontend network having the first plurality of layers supporting the network services includes providing a Radio Access Network (RAN) having a RAN Intelligent Controller (RIC) supporting a policy control and management layer and having a Radio Resource Manager (RRM) supporting a policy enforcement layer, and wherein the providing the backend network having the second plurality of layers supporting the network services includes providing a Core Network having a Policy Control Function (PCF) supporting the policy control and management layer, and having a Policy and Charging Enforcement Function (PCEF) supporting the policy enforcement layer.

An aspect of this description is directed to a Policy Orchestrator [8], including a memory storing computer-readable instructions, and a processor connected to the memory, wherein the processor is configured to execute the computer-readable instructions to perform operations to provide an end-to-end view between a frontend of a network having a first plurality of layers and a backend of the network having a second plurality of layers, and coordinate end-to-end policy decisions for the first plurality of layers of the frontend of the network and for the second plurality of layers of the backend of the network based on the end-to-end view.

The Policy Orchestrator described in [8], wherein the end-to-end view between the frontend of the network having the first plurality of layers and the backend of the network having the second plurality of layers includes a System/Platform view, a network functions view at a node level, a network services end-to-end view, and an application level view.

The Policy Orchestrator described in [8] to [9], wherein the processor is further configured to coordinate the policies between the first plurality of layers of the frontend of the network and the second plurality of layers of the backend of the network by providing intercommunications between the first plurality of layers and between the second plurality of layers.

The Policy Orchestrator described in [8] to [10], wherein the intercommunications between the first plurality of layers and between the second plurality of layers includes Push Messages and Pull messages communicated between the first plurality of layers and between the second plurality of layers.

The Policy Orchestrator described in [8] to [11], wherein the Push Messages and Pull messages includes one of a Pull Message communicated from a lower level to an upper level to obtain a policy specific decision at an enforcement level, a Pull Message communicated from the upper level to the lower level to obtain resource level and service level requirement information, a Push Message communicated from the lower level to the upper level to provide the resource level and service level requirement information, or a Push Message communicated from the upper level to the lower level to provide the policy specific decision.

The Policy Orchestrator described in [8] to [12], wherein the processor is further configured to coordinate end-to-end policy decisions for the first plurality of layers of the frontend of the network and for the second plurality of layers of the backend of the network by providing the policy orchestration at a multi-access level management entity providing cloud-computing capabilities at an edge of the network.

The Policy Orchestrator described in [8] to [13], wherein the frontend of the network having the first plurality of layers includes a Radio Access Network (RAN) having a RAN Intelligent Controller (RIC) supporting a policy control and management layer and a Radio Resource Manager (RRM) supporting a policy enforcement layer, and wherein the backend network having the second plurality of layers includes a Core Network having a Policy Control Function (PCF) supporting the policy control and management layer, and a Policy and Charging Enforcement Function (PCEF) supporting the policy enforcement layer.

An aspect of this description is directed to a non-transitory computer-readable media having computer-readable instructions stored thereon [15], which when executed by a processor causes the processor to perform operations including providing a frontend network having a first plurality of layers supporting network services, providing a backend network having a second plurality of layers supporting the network services, and providing policy orchestration by providing an end-to-end view between the frontend network and the backend network, and coordinating end-to-end policy decisions for the first plurality of layers of the frontend network and for the second plurality of layers of the backend network based the end to end view.

The non-transitory computer-readable media described in [15], wherein the providing the end-to-end view between the frontend network and the backend network includes providing visibility at a System/Platform level, visibility of network functions at a node level, visibility at a network services end-to-end level, and visibility at an application level.

The non-transitory computer-readable media described in [15] to [16], wherein the coordinating the policies between the first plurality of layers of the frontend network and the second plurality of layers of the backend network includes providing Push Messages and Pull messages between the first plurality of layers and between the second plurality of layers.

The non-transitory computer-readable media described in [15] to [17], wherein the providing Push Messages and Pull messages between the first plurality of layers and between the second plurality of layers includes one of providing a Pull Message communicated from a lower level to an upper level to obtain a policy specific decision at an enforcement level, providing a Pull Message communicated from the upper level to the lower level to obtain resource level and service level requirement information, providing a Push Message communicated from the lower level to the upper level to provide the resource level and service level requirement information, or providing a Push Message communicated from the upper level to the lower level to provide the policy specific decision.

The non-transitory computer-readable media described in [15] to [18], wherein the providing the policy orchestration includes providing the policy orchestration at a multi-access level management entity providing cloud-computing capabilities at an edge of the network.

The non-transitory computer-readable media described in [15] to [19], wherein the providing the frontend network having the first plurality of layers supporting the network services includes providing a Radio Access Network (RAN) having a RAN Intelligent Controller (RIC) supporting a policy control and management layer and having a Radio Resource Manager (RRM) supporting a policy enforcement layer, and wherein the providing the backend network having the second plurality of layers supporting the network services includes providing a Core Network having a Policy Control Function (PCF) supporting the policy control and management layer, and having a Policy and Charging Enforcement Function (PCEF) supporting the policy enforcement layer.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing a policy orchestration framework to support an end-to-end (E2E) policy architecture with top to bottom policy orchestration, comprising:

providing a frontend network having a first plurality of layers supporting network services;

providing a backend network having a second plurality of layers supporting the network services, wherein the first plurality of layers and the second plurality of layers include a policy orchestration layer, a policy control and management layer, and a policy enforcement layer; and providing policy orchestration by providing an end-to-end view between the frontend network and the backend network, and coordinating end-to-end policy decisions for the first plurality of layers of the frontend network and for the second plurality of layers of the backend network based on the end-to-end view.

2. The method of claim 1, wherein the providing the end-to-end view between the frontend network and the backend network includes providing visibility at a System/Platform level, visibility of network functions at a node level, visibility at a network services end-to-end level, and visibility at an application level.

3. The method of claim 1, wherein the coordinating the end-to-end policy decisions for the first plurality of layers of the frontend network and the second plurality of layers of the backend network includes providing intercommunications between the first plurality of layers and between the second plurality of layers.

4. The method of claim 3, wherein the providing intercommunications between the first plurality of layers and between the second plurality of layers includes providing Push Messages and Pull messages between the first plurality of layers and between the second plurality of layers.

5. The method of claim 4, wherein the providing Push Messages and Pull messages between the first plurality of layers and between the second plurality of layers includes one of providing a Pull Message communicated from a lower level to an upper level to obtain a policy specific decision at an enforcement level, providing a Pull Message communicated from the upper level to the lower level to obtain resource level and service level requirement information, providing a Push Message communicated from the lower level to the upper level to provide the resource level and service level requirement information, or providing a Push Message communicated from the upper level to the lower level to provide the policy specific decision.

6. The method of claim 1, wherein the providing the policy orchestration includes providing the policy orchestration at a multi-access level management entity providing cloud-computing capabilities at a network edge.

7. The method of claim 1, wherein the providing the frontend network having the first plurality of layers supporting the network services includes providing a Radio Access Network (RAN) having a RAN Intelligent Controller (RIC) supporting the policy control and management layer and having a Radio Resource Manager (RRM) supporting the policy enforcement layer, and wherein the providing the backend network having the second plurality of layers supporting the network services includes providing a Core Network having a Policy Control Function (PCF) supporting the policy control and management layer, and having a Policy and Charging Enforcement Function (PCEF) supporting the policy enforcement layer.

8. A Policy Orchestrator, configured to:

provide an end-to-end view between a frontend of a network having a first plurality of layers and a backend of the network having a second plurality of layers, wherein the first plurality of layers and the second plurality of layers include a policy orchestration layer, a policy control and management layer, and a policy enforcement layer; and providing policy orchestration to coordinate end-to-end policy decisions for the first plurality of layers of the frontend of the network and for the second plurality of layers of the backend of the network based on the end-to-end view.

9. The Policy Orchestrator of claim 8, wherein the end-to-end view between the frontend of the network having the first plurality of layers and the backend of the network having the second plurality of layers includes a System/Platform view, a network functions view at a node level, a network services end-to-end view, and an application level view.

10. The Policy Orchestrator of claim 8, further configured to coordinate the policies between the first plurality of layers of the frontend of the network and the second plurality of layers of the backend of the network by providing intercommunications between the first plurality of layers and between the second plurality of layers.

11. The Policy Orchestrator of claim 10, wherein the intercommunications between the first plurality of layers and between the second plurality of layers includes Push Messages and Pull messages communicated between the first plurality of layers and between the second plurality of layers.

12. The Policy Orchestrator of claim 11, wherein the Push Messages and Pull messages includes one of a Pull Message communicated from a lower level to an upper level to obtain a policy specific decision at an enforcement level, a Pull Message communicated from the upper level to the lower level to obtain resource level and service level requirement information, a Push Message communicated from the lower level to the upper level to provide the resource level and service level requirement information, or a Push Message communicated from the upper level to the lower level to provide the policy specific decision.

13. The Policy Orchestrator of claim 8, further configured to coordinate end-to-end policy decisions for the first plurality of layers of the frontend of the network and for the second plurality of layers of the backend of the network by providing the policy orchestration at a multi-access level management entity providing cloud-computing capabilities at an edge of the network.

14. The Policy Orchestrator of claim 8, wherein the frontend of the network having the first plurality of layers includes a Radio Access Network (RAN) having a RAN Intelligent Controller (RIC) supporting the policy control and management layer and a Radio Resource Manager (RRM) supporting the policy enforcement layer, and wherein the backend of the network having the second plurality of layers includes a Core Network having a Policy Control Function (PCF) supporting the policy control and management layer, and a Policy and Charging Enforcement Function (PCEF) supporting the policy enforcement layer.

15. A non-transitory computer-readable media having computer-readable instructions stored thereon, which when executed by a processor causes the processor to perform operations comprising:

providing a frontend network having a first plurality of layers supporting network services;

providing a backend network having a second plurality of layers supporting the network services, wherein the first plurality of layers and the second plurality of layers include a policy orchestration layer, a policy control and management layer, and a policy enforcement layer; and providing policy orchestration by providing an end-to-end view between the frontend network and the backend network, and coordinating end-to-end policy decisions for the first plurality of layers of the frontend network and for the second plurality of layers of the backend network based on the end-to-end view.

16. The non-transitory computer-readable media of claim 15, wherein the providing the end-to-end view between the frontend network and the backend includes providing visibility at a System/Platform level, visibility of network functions at a node level, visibility at a network services end-to-end level, and visibility at an application level.

17. The non-transitory computer-readable media of claim 15, wherein the coordinating the end-to-end policy decisions for the first plurality of layers of the frontend network and the second plurality of layers of the backend network includes providing Push Messages and Pull messages between the first plurality of layers and between the second plurality of layers.

18. The non-transitory computer-readable media of claim 17, wherein the providing Push Messages and Pull messages between the first plurality of layers and between the second plurality of layers includes one of providing a Pull Message communicated from a lower level to an upper level to obtain a policy specific decision at an enforcement level, providing a Pull Message communicated from the upper level to the lower level to obtain resource level and service level requirement information, providing a Push Message communicated from the lower level to the upper level to provide the resource level and service level requirement information, or providing a Push Message communicated from the upper level to the lower level to provide the policy specific decision.

19. The non-transitory computer-readable media of claim 15, wherein the providing the policy orchestration includes providing the policy orchestration at a multi-access level management entity providing cloud-computing capabilities at a network edge.

20. The non-transitory computer-readable media of claim 15, wherein the providing the frontend network having the first plurality of layers supporting the network services includes providing a Radio Access Network (RAN) having a RAN Intelligent Controller (RIC) supporting the policy control and management layer and having a Radio Resource Manager (RRM) supporting the policy enforcement layer, and wherein the providing the backend network having the second plurality of layers supporting the network services includes providing a Core Network having a Policy Control Function (PCF) supporting the policy control and management layer, and having a Policy and Charging Enforcement Function (PCEF) supporting the policy enforcement layer.

* * * * *